W. P. DALE.
Cultivators.
No. 136,708. Patented March 11, 1873.
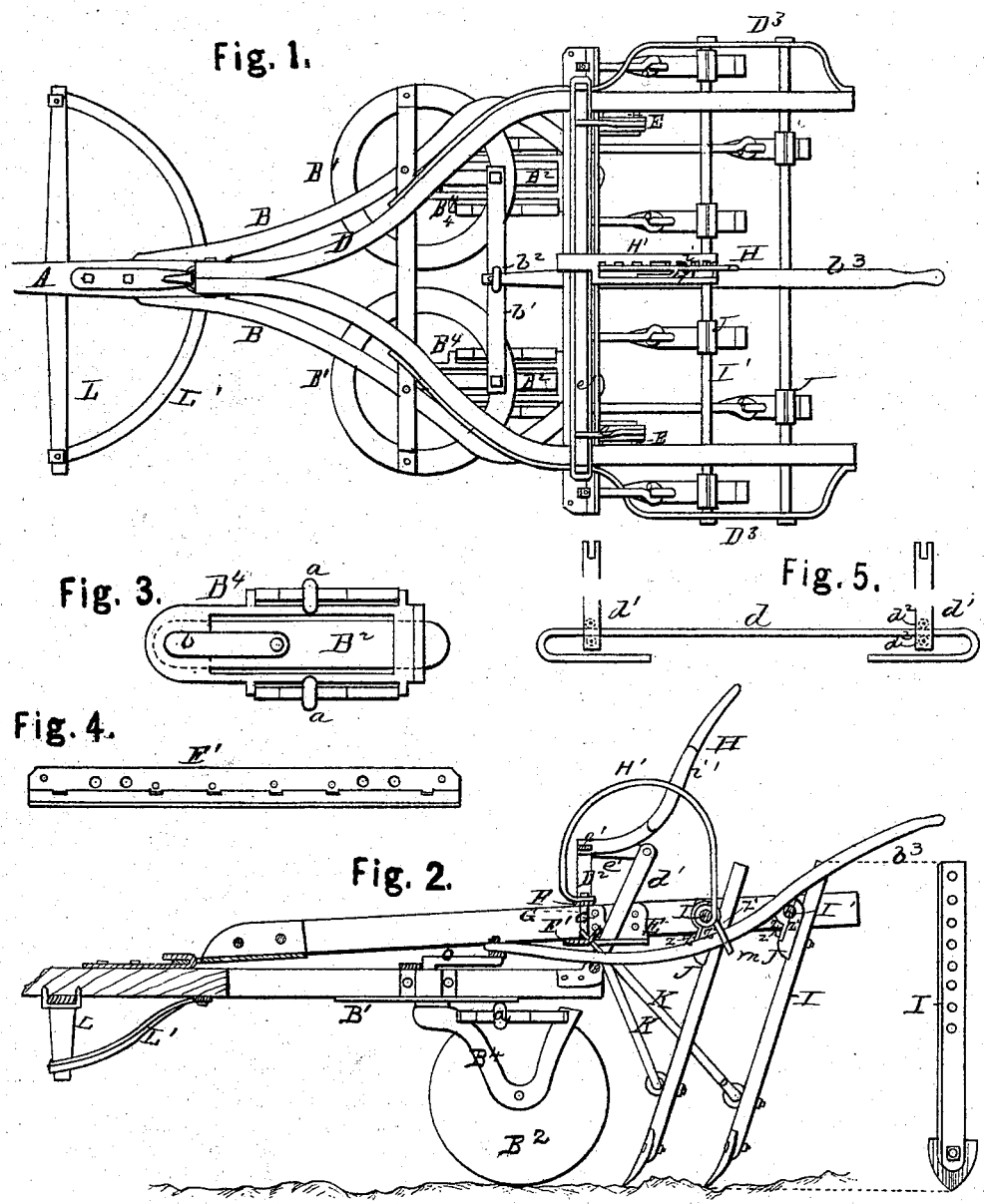
WITNESSES:
E. A. Bates.
Phil. C. Masi.
INVENTOR
William P. Dale
Chipman Hosmer & Co
Attys

UNITED STATES PATENT OFFICE.

WILLIAM P. DALE, OF AGRICULTURAL COLLEGE, PENNSYLVANIA.

IMPROVEMENT IN CULTIVATORS.

Specification forming part of Letters Patent No. 136,708, dated March 11, 1873.

*To all whom it may concern:*

Be it known that I, W. P. DALE, of Agricultural College, in the county of Centre and State of Pennsylvania, have invented a new and valuable Improvement in Cultivators; and do hereby declare that the following is a full, clear, and exact description of the construction and operation of the same, reference being had to the annexed drawing making a part of this specification, and to the letters and figures of reference marked thereon.

Figure 1 of the drawing is a representation of a top view of my invention. Fig. 2 is a vertical section. Figs. 3, 4, and 5 are details.

My invention has relation to cultivators; and it consists in the construction and novel arrangement of the guiding-wheels and attachments, cultivator-frame, devices for raising and lowering the same, shovel-beams, and devices for adjusting them to various positions, and regulating the depth of the shovels, all as hereinafter more fully described.

Referring to the drawing, A designates the draft-pole; B, the hounds, to the under sides of which are attached the "fifth-wheels" $B^1$. $B^2$ represents casters or guiding-wheels, supported by brackets $B^4$, pivoted to the hounds, and holding each a pair of anti-friction rollers, $a$, arranged to roll in contact with the under surfaces of the fifth-wheels. The spindles $b$ of said brackets are formed into crank-arms, and connected by means of a pivoted bar, $b^1$, having an eye at $b^2$ to receive the end of a lever, $b^3$, which extends to the rear end of the cultivator, and is used for the purpose of turning the guiding-wheels to the positions for guiding the implement as desired. It will be observed that the lever is to be moved to whatever side in the direction of which the implement is to be guided. D represents the cultivator frame, consisting of two bent bars converging at the forward end, where the frame is hinged to and above the draft-pole in advance of the guiding-wheels. The hounds, at their rear ends, are connected by means of a rod, $d$, which passes through slots in the lower ends of arms $d^1$, and between anti-friction rollers $d^2$, arranged within said slots. As the implement turns, or the hounds and cultivator-frame move independently to the sides, the rod $d$ plays through the slots in arms $d^1$. These arms pass upward through slotted plates E attached to the cultivator-frame, and are pivoted to arms $e$ projecting from a transverse bar, $e'$, supported above the frame D by standards $D^2$. F F' represent two transverse bars, one upon and the other below the frame D. These bars are held in position by the standards $D^2$ holding nuts on their lower ends, and by the bolts G, as shown. The cultivator-frame is raised and lowered and the shovels adjusted to any required depth by means of a lever, H, secured to the bar $e'$. H' is a curved slotted rack-bar, extending from the bar F to one of the bars supporting the shovel-beams. This rack-bar retains the lever H at different points, the latter being furnished with a flange, $i$, to engage with the rack-teeth, and with a spring, $i'$, to press said flange into contact with said teeth. I denotes the shovel-beams, attached to the transverse bars I' by means of the draw-hinges J. These draw-hinges are made in two sections, $z$ $z'$, each having a projecting end, and provided with a cavity or recess to receive the transverse bars I', and secured together by means of a bolt, which also passes through the adjustable shovel-beam I, as shown. By loosing the bolts of said hinges the beams may be adjusted to different positions along the bars I'. Several holes are made through each beam for the reception of said bolt, so that the beams may be adjusted vertically. K denotes diagonal braces, extending from the shovel-beams to the bar F'. This bar F' is flanged, and is perforated to receive the ends of the braces at points corresponding to the positions of the beams. The braces are perforated at their ends, and are held to the bar F' by pins passing through said perforations. These braces are adjustable lengthwise to correspond to the desired inclination of the shovel-beams. The bars I' are supported by the timbers of the frame D, and by curved plates $D^3$ secured to the sides of said frame, as shown. L designates a curved double-tree, pivoted to the pole by means of a curved bar, L'. This form of double-tree prevents strain or downward pressure on the horses' necks. $m$ designates a slotted plate depending from one of the bars I', and constituting the fulcrum of the lever $b^2$.

What I claim as my invention, and desire to secure by Letters Patent, is—

1. In a cultivator, the caster-wheels $B^2$, brackets B⁴, friction-rollers $a$, and fifth-wheel B¹, substantially as specified.

2. The draw-hinges J, as described, connecting the laterally and vertically adjustable shovel-beams I to the transverse bars I', substantially as specified.

3. The perforated flanged cross-piece F', in combination with the perforated longitudinally-adjustable beam-braces K and adjustable shovel-beams I, substantially as and for the purpose set forth.

4. The bar $d$, arms $d^1$ $e$, bar $e'$, lever H, and rack H', in combination with the frame D and hounds B, substantially as specified.

In testimony that I claim the above I have hereunto subscribed my name in the presence of two witnesses.

WILLIAM P. DALE.

Witnesses:
  W. C. HOOVER,
  J. J. BURKHOLDER.